(12) United States Patent
Bosch et al.

(10) Patent No.: US 7,656,396 B2
(45) Date of Patent: Feb. 2, 2010

(54) CALIBRATING DIGITAL PENS

(75) Inventors: Joan Bosch, Barcelona (ES); Emiliano Bartolome, Ponteverdra (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 634 days.

(21) Appl. No.: 11/186,882

(22) Filed: Jul. 22, 2005

(65) Prior Publication Data

US 2006/0022963 A1 Feb. 2, 2006

(30) Foreign Application Priority Data

Jul. 30, 2004 (GB) ................... 0417075.9

(51) Int. Cl.
*G09G 5/00* (2006.01)
(52) U.S. Cl. .................. 345/179; 345/156; 345/166
(58) Field of Classification Search ............... 345/179, 345/156, 166
See application file for complete search history.

(56) References Cited

U.S. PATENT DOCUMENTS

| | | | |
|---|---|---|---|
| 4,577,057 A | 3/1986 | Blesser | |
| 4,939,318 A | 7/1990 | Watson et al. | |
| 5,198,623 A | 3/1993 | Landmeier | |
| 2002/0148655 A1 | 10/2002 | Cho et al. | |
| 2005/0049517 A1* | 3/2005 | Mathew et al. | 600/546 |
| 2005/0147281 A1* | 7/2005 | Wang et al. | 382/119 |
| 2005/0156915 A1* | 7/2005 | Fisher | 345/179 |
| 2007/0030258 A1* | 2/2007 | Pittel et al. | 345/179 |

FOREIGN PATENT DOCUMENTS

| GB | 2390216 A | 12/2003 |
|---|---|---|
| WO | WO 99/32958 | 7/1999 |

* cited by examiner

*Primary Examiner*—Richard Hjerpe
*Assistant Examiner*—Leonid Shapiro

(57) ABSTRACT

A method of calibrating a digital pen (100) comprises the steps of:
i) acquiring calibration data indicative of parameters indicative of an offset between a nib (108) of the pen (100) and a field of view (124) of a camera (114) whilst the pen is in use; and
ii) using the calibration data to compensate for the offset in subsequently acquired pen usage data.

A digital pen, digital paper and software for calibrating a digital pen and a network comprising a digital pen are also disclosed.

20 Claims, 5 Drawing Sheets

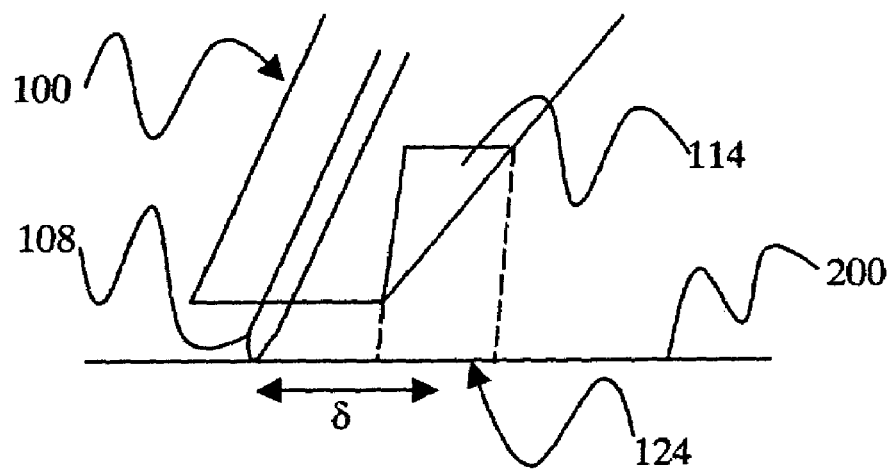
Figure 3 (Prior Art)
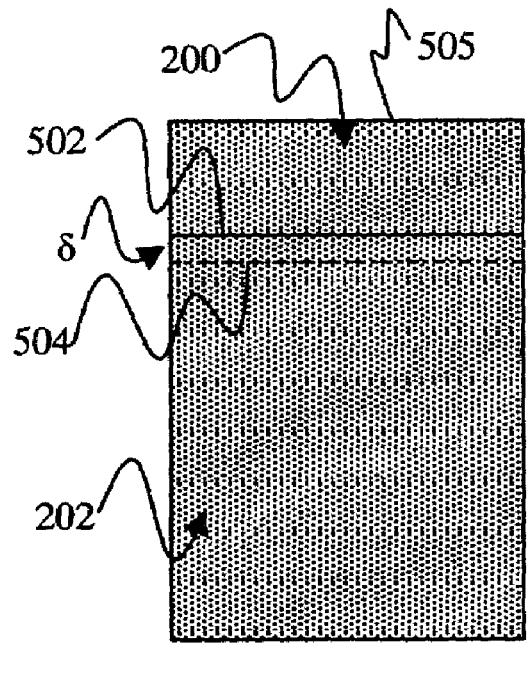 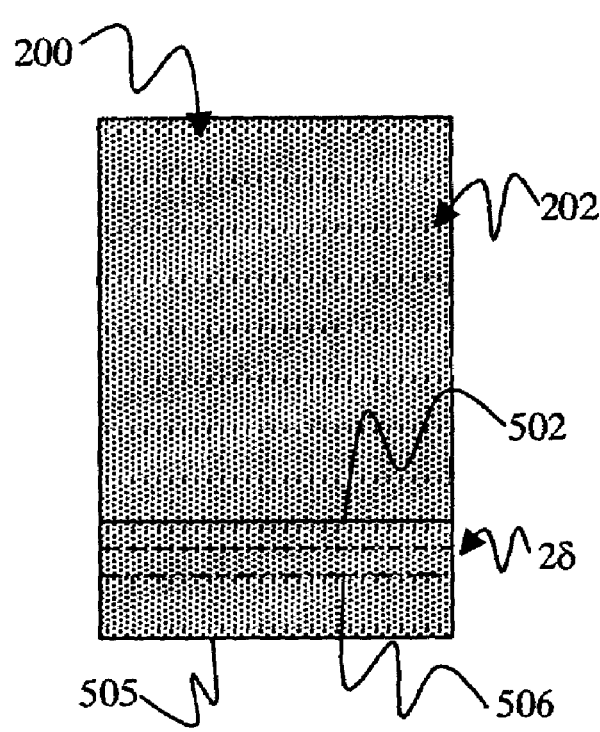
Figure 5a (Prior Art)   Figure 5b (Prior Art)

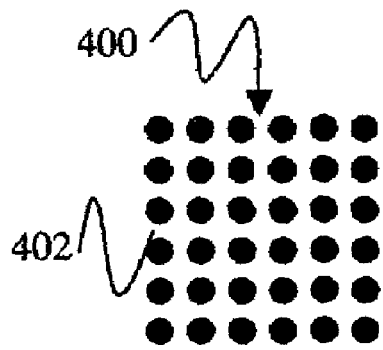
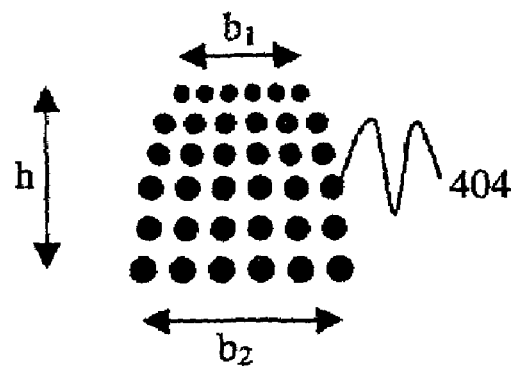
Figure 4a          Figure 4b
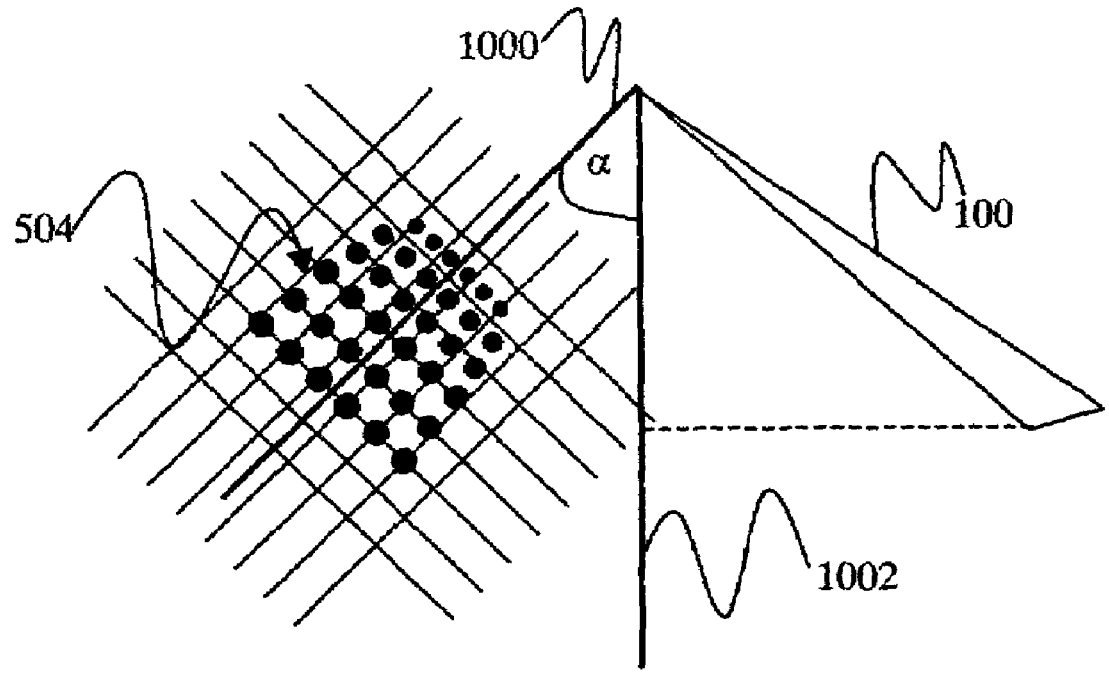
Figure 9

CALIBRATING DIGITAL PENS

FIELD OF THE INVENTION

This invention relates to calibrating digital pens, methods for use with calibrating digital pens and software for use with them.

DISCUSSION OF THE PRIOR ART

Referring now to FIGS. 1 to 5, a digital pen 100 adapted to write human readable ink in non-machine-readable IR transparent ink and to read a position dot pattern using infra-red light. The pen 100 has a housing 102, a processor 104 with access to memory 106, a removable and replaceable ink nib and cartridge unit 108, a pressure sensor 110 adapted to be able to identify when the nib is pressed against a document, an infra-red LED emitter 112 adapted to emit infra-red light, an infra-red sensitive camera 114 (e.g. a CCD or CMOS sensor), a wireless telecommunications transceiver 116, and a removable and replaceable battery 118. The pen 100 also has a visible wavelength warning light 120 (e.g. a red light) positioned so that a user of the pen can see it when they are using the pen, and a vibration unit 122 adapted to vibrate and to cause a user to be able to feel vibrations through the pen.

Such a pen exists today and is available from Anoto as the Logitech IO™ pen.

FIG. 2 shows, schematically, a part of an A4 sheet 200 of Anoto digital paper. This comprises a part of a very large non-repeating pattern 202 of dots 204. The overall pattern is large enough to cover 60,000,000 square kilometers. The pattern 202 is made from the dots 204 which are printed using infra-red absorbing black ink. The dots 204 are spaced by a nominal spacing of 300 μm, but are offset from their nominal position at intersections 205 of an imaginary grid a little way (about 50 μm), for example north, south, east or west, from the nominal position.

The sheet 202 has a pale grey appearance due to the dots 204.

In WO 01/126032, a 4×4 array of dots is described, and also a 6×6 array of dots, to define a cell 400. The dot pattern of an area of the dot pattern space codes for the position of that area in the overall dot pattern space.

Each cell has its dots at a unique combination of positions in the pattern space so as to locate the cell in the pattern space.

The contents of WO 01/126032 are hereby incorporated by reference, with especial reference on the dot pattern and the pen.

The pen 100, when in use writing on a page/marking a page, sees a 6×6 array of dots 204 and its processor 104 establishes its position in the dot pattern from that image. In use the LED 112 emits infra-red light which is reflected by the page 202 and detected by the camera 114. The dots 204 absorb the infra-red and so are detectable against the generally reflective background. Of course, the ink of the dots might be especially reflective in order to distinguish them (and the paper less reflective), or they may fluoresce at a different wavelength from the radiation that excites them, the fluorescent wavelength being detected. The dots 204 are detectable against the background page.

Ideally the camera 114 captures the 6×6 cell 400 of dots 204 as a square 402. However, when the camera 114 is inclined at an angle to the paper 200 the 6×6 cell 500 of dots is typically viewed as a trapezoid 404.

The processor 104 processes data acquired by the camera 114 and the transceiver 116 communicates processed information from the processor 104 to a remote complementary transceiver (e.g. to a receiver linked to a PC). Typically that information will include information related to where in the dot pattern the pen is, or has been, and its pattern of movement.

The camera 104 tracks the movements of the pen 100 while recording the position of the pen 100 at a high frequency. Once data relating to the positional history of the pen 100 is transferred to a host PC software can reconstruct what the user has written.

It is not possible to make the camera 104 aim exactly at the nib 108 of the pen 100. This is because the nib 108 would obscure part of the camera's field of view and reduce the information content of the image. In order to solve this problem it is conventional to direct the camera 104 to an area near, but offset from the tip of the nib 108. A nominal offset distance, $\delta$, between the tip and the centre of the camera's field of view is then known.

This known method of pen-tip position determination involves the use of a single, pre-determined linear correction to attempt to correct for the tip—camera field of view offset.

One problem is that this nominal offset distance is an average distance calculated from the digital pen design process, and from statistical analysis of the distribution of manufacturing tolerances. Not all the pens manufactured will have the same offset distance. Also, the offset distance can vary depending on the tilt and skew of the pen 100, caused by the user's style of holding the pen. The offset built into the prior art pen assumes certain fixed things about the way the pen is used: all users' are assumed to use the pen in the same way. For example, all users are typically assumed to be right handed and to hold the pen 100 inclined at 30° to the paper 200.

The relative rotation of the pen 100 and paper 200 in the prior art can lead to the nib-camera field of view offset being added in the wrong direction, so that instead of correcting for the offset the "offset correction software" makes the estimated position of the tip of the pen worse. When a line 502 is drawn upon the paper 200 the camera 104 views an apparent line 504 offset from the linear stroke 502 by the predetermined amount $\delta$, for example 0.7 mm. The pen 100 can be aligned with position location pattern 202 upon the paper 200 such that the relative rotation between the pattern and the pen 100 corresponds to that used for the factory offset correction of the pen 100. In this instance the correction routine compensates for the offset, $\delta$, so that the calculated position of the tip of the pen 100 registers with the actual location of the a pen stroke upon the paper 200. In conceptual terms, the offset correction software moves the estimated position of the tip of the pen 0.7 mm vertically upwards on the page towards the edge of the page 505.

However, if the pen 100 and the pattern 202 have a relative rotation of 180° the effect of the 'correction' is added, to add 0.7 mm to the 0.7 mm camera field of view—pen tip offset, so that the offset correction software calculates the tip of the nib 108 as being 2$\delta$ from its actual position. The pen 100 registers the line 502 as being a doubly offset line 506. Thus, increasing the offset error in the apparent location of the nib 102 upon the paper 200. In conceptual terms, instead of moving the apparent tip of the pen vertically downwards by 0.7 mm to estimate the tip as being on the line 502 (in FIG. 5b) the software moves the apparent position of the tip 0.7 mm in the same direction as before, relative to the dot pattern. That is the software moves the apparent position of the tip to be 0.7 mm closer to the edge of the page 505 and the correction software has now estimated the tip to be twice as from its real position as would have been estimated if there was no correction applied.

SUMMARY OF THE INVENTION

According to a first aspect of the present invention there is provided a method of calibrating a digital pen to compensate for a difference in a position determining pattern viewed by a camera of the pen and the position of a nib of the pen comprising the steps of:

i) acquiring calibration data indicative of parameters indicative of an offset between a nib of the pen and a field of view of a camera whilst the pen is in use; and ii) using the calibration data to compensate for the offset in usage data subsequently acquired in use of the pen.

This method allows data capture to be independent of the orientation of the pen with respect to a piece of media, typically digital paper. This increases the accuracy of the determination of the pen within a piece of media. Also, such a "calibration" involving the capture of calibration data by the specific pen in question contrasts to the prior art "correction" which involves the use of a pre-determined correction parameter.

Typically, there are two types of factors that influence the correction for the offset: (i) pen specific factors and (ii) user specific factors. An example of a pen specific factor is that it is normally assumed that the offset between the field of view of the camera and the tip of the nib is the same for all pens. This offset is typically set in the prior art to be about 0.7 mm. This is not always the case due to manufacturing tolerances in the production of digital pens.

An example of a user specific factor is an assumption is that the pen is held by a user at a pre-determined angle relative to the paper. This is often not the case as the inclination of the pen relative to the paper varies on a user by user basis, and also during use by any given user. This causes a corresponding variation in the aspect ratio of the area of the paper viewed by the camera, which causes an apparent distortion of the 6×6 dot cell viewed by the camera 314.

A further user specific factor is that it is typically assumed that the rotation of the pen relative to a longitudinal axis of a sheet of the paper is constant at a predetermined angle. Users have exhibited a tendency to rotate the pen in their hand during writing between pen strokes and/or rotate the paper relative to their writing hand/the pen. This results in a changing direction of offset between the nib tip and the longitudinal axis of the sheet of the paper during use of the pen. This is not compensated for by the current correction routines.

An attempt to overcome the problem of user rotation of the pen by providing a non-symmetrical pen so as to discourage rotation of the pen is detailed in WO 99/32958.

The method may comprise determining the relative planar rotation between the pen and a piece of media. The method may comprise determining the relative planar rotation wherein the piece of medium bears a position location pattern and an area of the position location pattern upon the media is used to define the relative planar rotation.

The method may comprise determining an angle of inclination of the pen with respect to a plane substantially containing the piece of media. The method may comprise calculating at least one calibration factor from the relative planar rotation and the angle of inclination and may further comprise applying the at least one calibration factor to usage data captured by the pen subsequently.

This method allows data capture to be independent of the orientation of the pen with respect to a piece of media.

The method may comprise repeating steps (i) and (ii) at intervals. The method may comprise repeating steps (i) to (ii) at user defined intervals.

The repeated calibration of the pen over time ensures that a high level of accuracy can be maintained irrespective of predictable physical changes within the pen, and the user's style of handwriting, over time The method may comprise providing a piece of physical media having a calibration area thereupon. The method may comprise placing the pen adjacent the calibration area in step (i). The method may comprise placing the pen adjacent the calibration area in step (i) for a period of time such that a statistically significant number of samples of calibration data is acquired. The method may comprise selectively discarding one or more samples of calibration data. The method may comprise tracing a pre-defined locus within the calibration area. The locus may take the form of a character, phrase or shape.

The method may comprise placing the pen adjacent a defined target area having defined reference co-ordinates within the calibration area in step (i). The method may comprise providing a plurality of regions within the calibration area, the region comprising respective portions of position location angularly displaced relative to one another. The method may comprise marking one, or each, of the regions with a symbol indicative of the target area.

The method may comprise providing at least one region having position location pattern rotated with respect to the orientation of a main area of position location pattern. The method may comprise providing a plurality of regions each having position location pattern rotated with respect to the orientation of a main area of position location pattern by varying amounts. For example, there may be provided four sub-regions each having position location pattern rotated by 0°, 90°, 180°, and 270° respectively with respect to a main area of position location pattern.

The method may comprise comparing measured co-ordinates acquired in step (i) for each region to the reference co-ordinates of the target area stored in a processing means. The method may comprise deriving a deviation parameter indicative of the difference between the measured co-ordinates and the reference co-ordinates for reach region.

The method may comprise determining a rotation parameter indicative of the degree of rotation of the pen relative to the paper. The method may comprise determining the parameter indicative of the degree of rotation of the pen relative to the paper in each of the regions. The method may comprise comparing an alignment of position location pattern captured by a camera of the pen to a reference alignment stored in a processing means of the pen. The method may comprise defining the reference alignment by a fixed internal orientation of the position location pattern relative to a grid. The method may comprise performing an error minimisation to determine which of the regions has a rotation in a plane substantially including the piece of medium closest to that of a projection of a longitudinal axis of the pen on to the piece of media. The method may comprise minimising the error between the reference alignment and the projection of the longitudinal axis of the pen on to the piece of media.

The method may comprise determining an inclination parameter indicative of the an angle of inclination between the pen relative and a plane substantially including the piece of media by means of an analysis of an area of position location pattern captured by the pen. The method may comprise determining the parameter indicative of the angle of inclination in each of the regions. The method may comprise carrying out a geometric analysis upon a cell of the position location pattern captured by a camera of the pen. The method may comprise determining measured dimensions of a geometric figure composed of points of the position location pattern. The method may comprise determining measured dimensions of a trapezoid, a trapezium, or a similar quadrilateral geometric figure. The method may comprise calculating the parameter indicative of the angle of inclination factor for a trapezoid, or a trapezium, according to the following: $\beta=f(h, b_1, b_2)$ (where $\beta$ is the angle of inclination, h is the apparent height of the trapezoid, or trapezium as captured by the pen, and $b_1$ and $b_2$ are the respective apparent lengths of the bases of the trapezoid, or trapezium, as captured by the pen).

The method may comprise applying an algorithm to generate a calibration factor to any one, or combination, of the following: the deviation parameter, the rotation parameter, the inclination parameter.

The method may comprise executing steps (i) and (ii) at a processor of the pen. The method may comprise executing step (i) at a processor of the pen and transmitting at least a fraction of the calibration data to a remote processor for the execution of step (ii). The methods may comprise passing all usage data to the remote processor.

The method may comprise transmitting the usage and the at least a fraction of the calibration data to the remote processing means via a wireless connection.

The method may comprise storing usage data and the calibration data in data storage means associated with the processing means. The method may comprise uploading the usage data and the calibration data to a remote processing means via a wired connection.

Thus, the calibration can be carried out on-board the pen or can be carried out at a remote processing means such as a PC arranged to process the usage data.

The method may comprise calibrating at least one of a plurality of pens independently of the remainder of the plurality of pens.

The independent calibration of each pen results in an improved accuracy of reading of strokes of the pen due to individual physical characteristics of the pen being accounted for.

The method may comprise storing user specific calibration data. The method may comprise storing the user specific calibration data at a remote processor. The method may comprise acquiring user verification data at the start of a period of usage of the digital pen. The method may comprise applying user specific calibration data, corresponding to a specific user identified by a particular piece of user verification data, to usage data acquired during the period of usage of the digital pen.

According to a second aspect of the present invention there is provided a digital pen comprising a nib, a camera and a processor, the nib being arranged to contact a medium, the camera being arranged to capture an image of an area of the medium adjacent the point of contact of the nib with the medium and the processor being arranged to process the image to generate calibration data indicative of parameters indicative of an offset between the nib and a field of view of the camera for use in compensating for the offset in subsequently acquired usage data.

The pen may comprise memory arranged to store a calibration factor derived from the calibration data. The processor may be arranged to apply the calibration factor to usage data. The processor may be arranged to update the calibration factor in response to a further calibration factor received by the processor. The further calibration factor may be generated by the processor. The calibration factor may be derived by a processor remote from the pen, from the calibration data and is transmitted to the processor of the pen.

According to a third aspect of the present invention there is provided software which when executed upon a processor causes the processor to derive from data acquired by a camera of a digital pen calibration data indicative of an offset between a nib of the pen and a field of view of the camera.

The software when executed upon a processor may cause the processor to generate a calibration factor from the calibration data. The software when executed upon a processor may cause the processor to apply the calibration factor to usage data acquired by the digital pen.

According to a fourth aspect of the present invention there is provided a processor arranged to generate calibration data indicative of an offset between a nib of a digital pen and a field of view of a camera of the pen from data acquired the camera.

The processor may be arranged to derive at least one calibration factor from the calibration data. The processor may be arranged to apply the or each calibration factor to pen usage data There may be a further processor arranged to derive at least one calibration factor from the calibration data generated by the processor. The further processor may be arranged to apply the calibration factor to pen usage data.

According to a fifth aspect of the present invention there is provided digital paper comprising a body section of position location pattern and at least one calibration region, the calibration region bearing position location pattern having at least one characteristic different to that of the body section.

The calibration region may comprise a pen target marker corresponding to specific calibration co-ordinates. The digital paper may comprise a plurality of calibration regions each of which contains an area of position location pattern rotated relative to the other calibration regions.

According to a sixth aspect of the present invention there is provided a pack of digital paper wherein at least one sheet is digital paper according to the fifth aspect of the present invention.

According to a seventh aspect of the present invention there is provided a network comprising a digital pen and a remote server the pen comprising a nib, a camera and a processor, and a transceiver, the nib being arranged to contact a medium, the camera being arranged to capture an image of an area of the medium adjacent the point of contact of the nib with the medium and the processor being arranged to process the image to generate calibration data indicative of parameters indicative of an offset between the nib and a field of view of the camera for use in compensating for the offset in subsequently acquired pen usage data, the transceiver being arranged to communicate with the server; the server comprising a transceiver arranged to communicate with the pen and a further processor.

The transceiver of the pen may be arranged to transmit at least some of the calibration data to the server, which is arranged to process the calibration data to derive a calibration factor to be applied to the usage data. The calibration data may be transmitted from the server to the pen, the processor of the pen being arranged to apply the calibration factor to the pen usage data. The pen usage data may be transmitted from the pen to the server where the calibration factor is applied to the pen usage data. User specific calibration data may be stored at the server. User verification data may be acquired at the start of a period of usage of the digital pen. User specific calibration data, corresponding to a specific user identified by a particular piece of user verification data, may be applied to usage data acquired during the period of usage of the digital pen at one of the following: the digital pen, the server.

The term digital pen is intended to cover any hand held device that is arranged to be used with a medium providing a position location pattern.

Further aspects of the invention may provide machine readable mediums containing instructions which when read onto a machine cause that machine to perform and/or perform as any of the above aspects of the invention.

The machine readable medium may be any of the following non-exhaustible list: a floppy disk, a CD ROM/RAM, a DVD ROM/RAM (including -R/-RW and +R/+RW), a hard drive, a memory, a transmitted signal (including an Internet download, ftp transfer and the like), a wire.

BRIEF DESCRIPTION OF THE DRAWINGS

The invention will now be described, by way of example only, with reference to the accompanying drawings, in which:

FIG. 3 is a schematic representation of a prior art nib-camera offset of a digital pen upon a piece of digital paper;

FIGS. 4a and 4b are representations of a 6×6 cell of dots of the digital paper of FIG. 2 as viewed by a camera of the pen of FIG. 1 at ideal and non-ideal angles of inclination relative to the paper, respectively;

FIGS. 5a and 5b are representations of the offset between a tip of the digital pen of FIG. 1 from a field of view of a camera of the digital pen at (a) 0° nominal rotation relative to a longitudinal axis of the paper of FIG. 2 and (b) 180° nominal rotation relative to a longitudinal axis of the paper of FIG. 2 respectively;

FIG. 9 is a representation of the relative orientation of a 6×6 cell of dots of the paper of FIG. 6 and the pen of FIG. 1;

DESCRIPTION OF THE PREFERRED EMBODIMENTS

Figure 1:
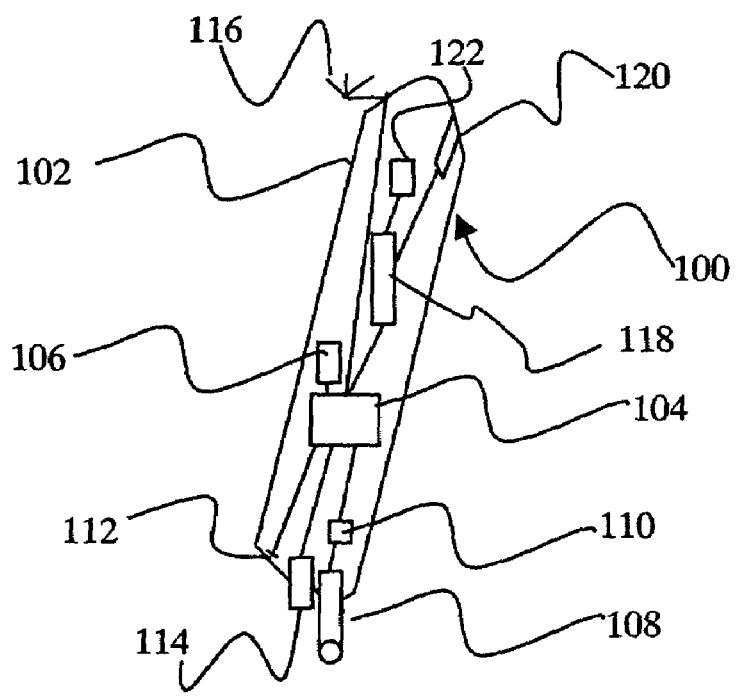
FIG. 1 is a schematic representation of a digital pen of the prior art.
Figure 2:
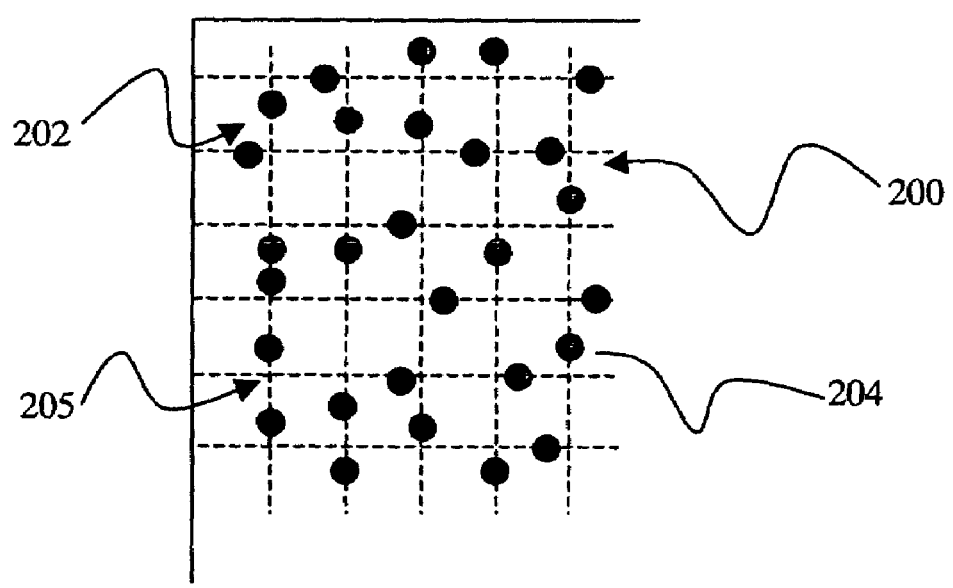
FIG. 2 is a schematic representation of an area of position location pattern of a sheet of digital paper of the prior art.
Figure 8:
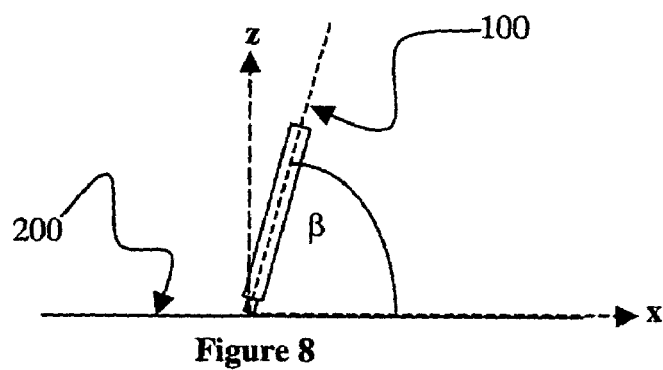
FIG. 8 is a schematic representation of the angle of inclination of a digital pen of FIG. 1 relative to the piece of digital paper of FIG. 6.
Figure 6:
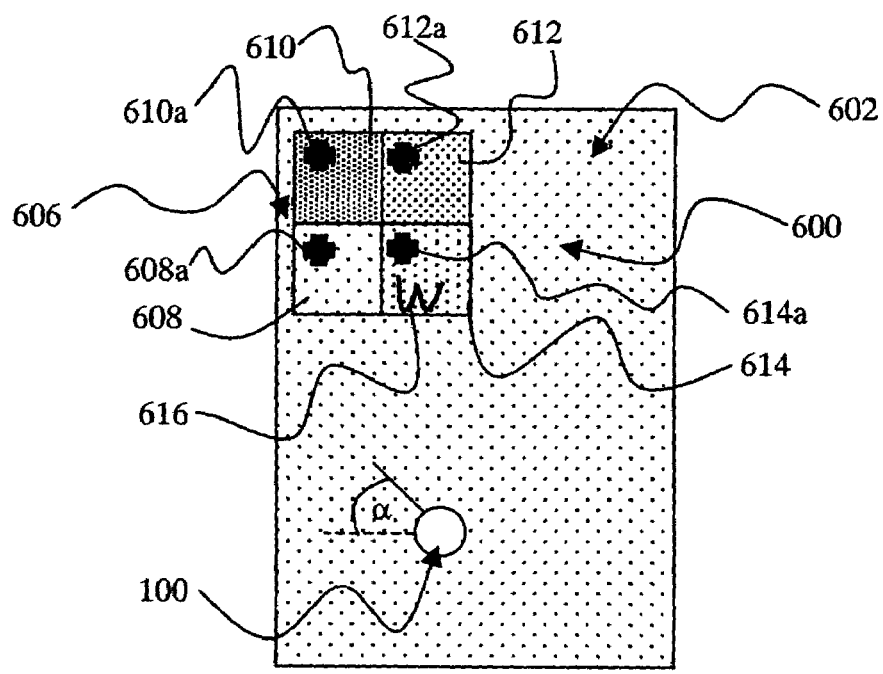
FIG. 6 is a schematic representation of a sheet of digital paper comprising a calibration region according to one embodiment of the present invention.
Figure 7:
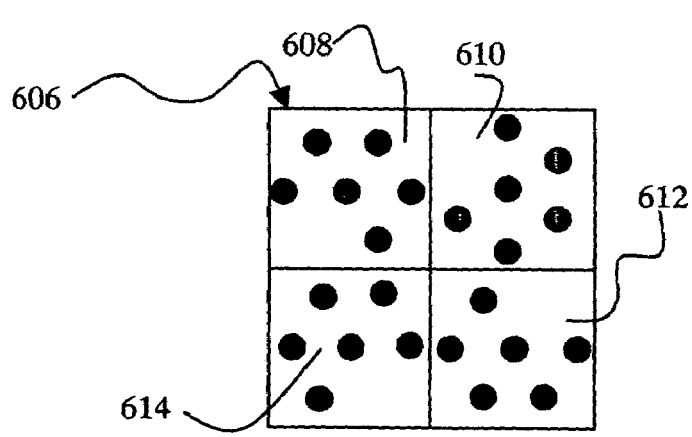
FIG. 7 is a detailed schematic representation of a part of a calibration region of the digital paper of FIG. 6.

Referring now to FIGS. 1, 4a, 4b and 6 to 9, a sheet of digital paper 600 for use with the digital pen 100 comprises position location pattern 602 of dots as described in relation to the prior art and a calibration area 606 that has regions 608, 610, 612, 614 of pattern. The pattern in each of the regions 608, 610, 612, 614 is rotated in successive equi-angular steps, in this case 90° steps, away from alignment with the pattern 602 upon the paper, i.e. 0°, 90°, 180°, 270°. It will be appreciated that the rotation of the pattern could be at larger or smaller angular steps depending upon the accuracy of the calibration desired, and that there may be fewer, or more, regions with pattern at different rotations. The regions 608, 610, 612, 614 may represent a small fraction of the area of a page of the sheet 600. The fraction may be for example be a 1 cm by 1 cm area. It will be appreciated that other size of area may be suitable.

Indeed, in an alternative embodiment a calibration page may be used in which the whole page forms one, or more calibration regions. Any area in between the small fraction of the page and the whole page may be suitable.

Each of the regions 608, 610, 612, 614 contains a respective target 608a, 610a, 612a, 614a visible to the user, typically printed upon the page. Each of the targets 608a, 610a, 612a, 614a has respective reference co-ordinates in position-determining pattern space. Details of the reference co-ordinates for each target are stored in the processor 104. The targets 608a, 610a, 612a, 614a are spaced apart sufficiently that the processor 104 can determine which target the user has selected from the pen-acquired data relating to the dot pattern in the vicinity of the target.

The user may be required to dwell upon the targets for a length of time in order that a statistically significant number of samples of data can be acquired by the camera 114. This also allows the user to move the nib 108 closer to the target 608a, 610a, 612a, 614a should their aim be poor in the first instance. The processor 104 can be arranged to discard data relating to poor first attempts at locating the target, for example by discarding data relating to co-ordinates more than a threshold distance from the target co-ordinates.

In an alternative, the user may be required to draw or write a known shape or phrase, for example the letter "W" 616 within at least one region 608, 610, 612, 614. This produces more samples of a user's writing angles compared to tapping targets.

The digital pen 100 is held in the hand of a user whilst writing at an angle relative to a longitudinal axis of a piece of digital paper, in this example at an angle α. Also, the pen 100 is inclined at an angle β with respect to the plane of a piece of digital paper 600.

In a preferred embodiment the processor 104 executes a calibration routine that analyses captured images of the regions 608, 610, 612, 614 in order to apply a calibration factor to co-ordinates of the pen's location upon the paper 600 determined from images of the paper 600 captured by the camera. Typically, the processor 104 has the calibration routine installed upon it in the form of firmware. This allows the updating of the calibration routine by the download of firmware from a server via the wireless transceiver 116 as updates of the firmware are available.

The camera 114 captures images of each of the regions 608, 610, 612, 614 in turn. The processor 104 processes the captured images of the regions 608, 610, 612, 614 to determine the pen's measured co-ordinates upon the paper 600 from the 6×6 cell of dots viewed by the camera 114.

As each of the targets 608a, 610a, 612a, 614a underlies pattern relating to their respective reference co-ordinates the processor 104 compares the measured co-ordinates of the pen 100 to the stored reference co-ordinates of each of the targets 608a, 610a, 612a, 614a. Differences between the respective measured co-ordinates and the reference co-ordinates are calculated for each of the targets 608a, 610a, 612a, 614a.

In order to determine the angle of rotation, α, of the pen 100 from a reference orientation with respect to the position location pattern 602 the nib 108 is placed adjacent each of the regions 608, 610, 612, 614 of the calibration area 608. The nib 108 will typically leave a mark upon the paper 600 but this is not essential. An advantage of leaving a mark on the paper is that the user can see that they have placed the nib 108 correctly on the calibration marker. In this embodiment the order in which the nib 108 is placed adjacent a region does not matter since the pen has been programmed with the angle of rotation of each of the regions 608-614. A portion of the overall pattern may be reserved for each of these regions 608-614.

The degree of rotation of the pen 100 relative to the paper 600 can be determined by a comparison from the images of the dots captured by the camera 114. This is due to the fact that the array of dots has a fixed internal orientation 1000 within the pattern relative to the imaginary grid about the intersections of which the dots are distributed. Thus, a comparison of the images captured by the camera 114 to reference alignment data stored within the pen 100 allows the relative angular rotation, α, of a projection 1002 of the longitudinal axis of the pen 100 onto the paper 600 to be determined.

In order to determine the angle of inclination, β, of the pen 100 with respect to the paper 600 the processor 104 analyses the geometric arrangement of the 6×6 cell 900 of dots 604 upon the paper 600 as captured by the camera 114. As the pen 100 is inclined in the hand of the user whilst writing the 6×6 cell 900 appears as a trapezoid 404 when captured by the camera 114.

The processor 104 determines a parameter indicative of the angle of inclination, β, of the pen 100 relative to the paper 600 according to the following geometric analysis:

$$\beta = f(h, b_1, b_2)$$

where: h=the height of the trapezoid as viewed by the camera $b_1$=the length of a first side of the trapezoid as viewed by the camera $b_2$=the length of a second side of the trapezoid as viewed by the camera.

β is the angle of inclination between the pen 100 and the paper 600.

The angle of relative rotation between the pen 100 and the paper 600 is determined for a user in each of the regions 608, 610, 612, 614, as is the angle of inclination of the pen 100.

In calibration for the offset in the determined location of the pen 100 on the paper 600 compared to the pen's actual location on the paper 600 the rotational calibration is applied by means of scaled calibration factors.

Typically the scaled calibration factors are calculated using data acquired at two preferred rotational angles of calibration pattern between which the pen 100 lies relative to the paper 600. An error minimisation analysis to minimise the error between the internal orientation of the pattern and the projection 1002 of the longitudinal axis of the pen on to the paper 600 is used to determine the two preferred rotational angles of calibration pattern.

For example, where the pen 100 and the paper 600 are rotated between 0° and 90° relative to each other the following calibrations are used:

$$X = x + f(\alpha,\beta) + g(\alpha, \delta x_0, \delta x_{90})$$

$$Y = y + f'(\alpha,\beta) + g'(\alpha, \delta y_0, \delta y_{90})$$

Where: X and Y are the actual co-ordinates of the location of the pen upon the paper as corrected by the calibration procedure;

x and y are the measured co-ordinates as determined by the digital pen from the images captured by the camera;

$\delta x_0$ and $\delta x_{90}$ are the differences between the measured x ordinate and the reference x ordinate of the target in the calibration regions with pattern rotated by 0° and 90° respectively; and $\delta y_0$ and $\delta y_{90}$ are the differences between the measured y ordinate and the reference y ordinate of the target in the calibration regions with pattern rotated by 0° and 90° respectively.

Typical forms of the calibration factors are as follows, where $0° \leq \alpha \leq 90°$:

$$g(\alpha, \delta x_0, \delta x_{90}) = \alpha((\delta x_{90} - \delta x_0)/90) + \delta x_0 \text{ and } g = g'$$

$$f(\alpha,\beta) = A \sin(\alpha) \sin(\beta - \alpha(\beta_{90} - \beta_0)/90 + \beta_0)$$

$$f'(\alpha,\beta) = A \cos(\alpha) \sin(\beta - \alpha(\beta_{90} - \beta_0)/90 + \beta_0)$$

Where: A is a scale parameter;

$\beta_0$ and $\beta_{90}$ are the angles of inclination of the digital pen when the calibration is performed in the calibration regions with pattern rotated by 0° and 90° respectively.

The scale parameter, A, is determined at the time of production of the digital pen 100. Typically, A has a value similar to the distance between the digital pen 100 and the paper 600.

Once determined the calibration factors are applied to strokes of the pen 100 upon the paper 600 in order to improve the accuracy of the pens measured position upon the paper 600. In a preferred embodiment, the calibration factors are applied to the pen measured co-ordinates until a user recalibrates the pen 100 in the manner described hereinbefore.

Typically, the calibration detailed hereinbefore can be carried out as often as the user wishes to maintain a high degree of accuracy in determining the location of the pen 100 upon the paper 600. The processor 104 may be arranged to prompt a user for a calibration after a pre-determined amount of time has elapsed, for example by lighting an LED and/or preventing the pen from operating until a recalibration is performed.

It is envisaged that in some embodiments the pen 100 may be calibrated once to compensate for a user's grip on the pen 100. The pen 100 will not usually be calibrated thereafter. Such a calibration may take place at the point of sale of the pen 100 to the user.

Alternatively, or additionally, in other embodiments the pen 100 may be calibrated by a manufacturer to compensate for manufacturing tolerances that affect the accuracy of position determination of the pen 100 upon the paper 600. Such factors include the nib-camera offset and the camera to page distance. The pen may or may not be subsequently calibrated to compensate for a user's grip on the pen 100.

In other embodiments the pen can be calibrated whenever the user wishes to do so. In still other embodiments, each page, or every $n^{th}$ page of published paper may have calibration regions printed upon them.

It will be appreciated that the algorithms used to generate the calibration factors shown hereinbefore are exemplary only and are not to limit the scope of the invention. The invention encompasses any algorithm suitable to generate appropriate calibration factors.

Figure 10:
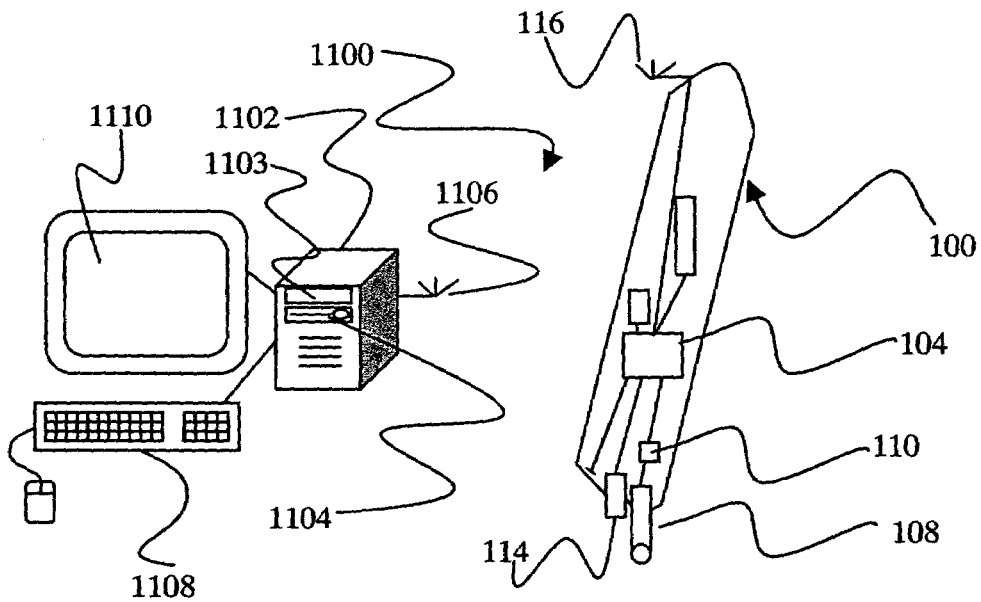
FIG. 10 is a representation of a network comprising the pen of FIG. 1 according to a further embodiment of the present invention.

Referring now to FIG. 10, a wireless network 1100 comprises a digital pen 100 and a server 1102, for example a PC. The pen 100 is similar to that described in relation to FIG. 1 and corresponding parts are accorded similar reference numerals. The server 1102 comprises a data storage device 1103, for example a magnetic hard disc or a DVD, a processor 1104, a wireless transceiver 1106, a keyboard 1108 and a screen 1110.

The pen 100 captures images of a piece of digital paper in the standard manner, as described hereinbefore. However, the processor 104 is not arranged to generate a calibration factor. The processor 104 is arranged to process captured images of the digital paper from the camera 114 in order to generate a data stream. Typical data contained within the data stream includes the measured x and y co-ordinates of the nib 108 (x,y), the relative angle of rotation between the pen 100 and the digital paper (α), the angle of inclination of the pen 100 (β), the time (t) and the pressure reading (p) from the pressure sensor 110. The data stream is passed to the pen's wireless transceiver 116 and transmitted to the wireless transceiver 1106 of the server 1102. The processor 104 can be arranged to pass only samples of the data stream to the wireless transceiver 116 in order to reduce the amount of data transmitted across the network 1100. Typically, all of the (x,y), (t) and (p) data will be transmitted between the pen 100 and the server 1102 as this information is necessary to record the strokes of the pen 100 upon the digital paper. However, as the (α) and (β) data is not required as frequently as the (x,y), (t) and (p) data, this data is typically transmitted less frequently than the sampling frequency of the camera 114. This is because the (α) and (β) data is used when calculating calibration factors.

The processor 1104 is arranged to execute a calibration routine to determine calibration factors as described hereinbefore in relation to FIGS. 1, 4a, 4b and 6 to 9. These calibration factors are applied to subsequent pen strokes when they are transmitted from the pen 100 to the server 1102.

In an alternative embodiment, the server 1102 stores a number of pre-recorded user specific calibration factors upon the data storage device 1103. The user specific calibration factors having been determined previously, for example using the methodologies described hereinbefore.

Upon commencing using the pen 100 a user is required to identify themselves, for example by entering a password on the keyboard 1110, or checking a "Sign On" box on a piece of digital paper. The server 1102 then downloads the user specific calibration factors corresponding to the user from the storage device 1103. The user specific calibration factors are applied to subsequent pen strokes transmitted to the server 1102 from the pen 100. Typically, the user specific calibration factors are applied to pen strokes until the user signs off, for example by entering a sign off code at the keyboard, or checking a "Sign Off" box on a piece of digital paper. Alternatively, in some embodiments the user specific calibration factors may be cancelled after the pen 100 has remained inactive for a pre-determined length of time. In other embodiments the user specific calibration factors may be cancelled when a further user overwrites the existing calibration factor that is in use.

It will be appreciated that whilst described in relation to a wireless network the connection between the pen and the server 1102 may be made via a wired connection. For example, the pen may store usage and calibration data in memory associated with the processor and this data can be downloaded to a PC via a USB cradle connected to the PC.

Figure 11:
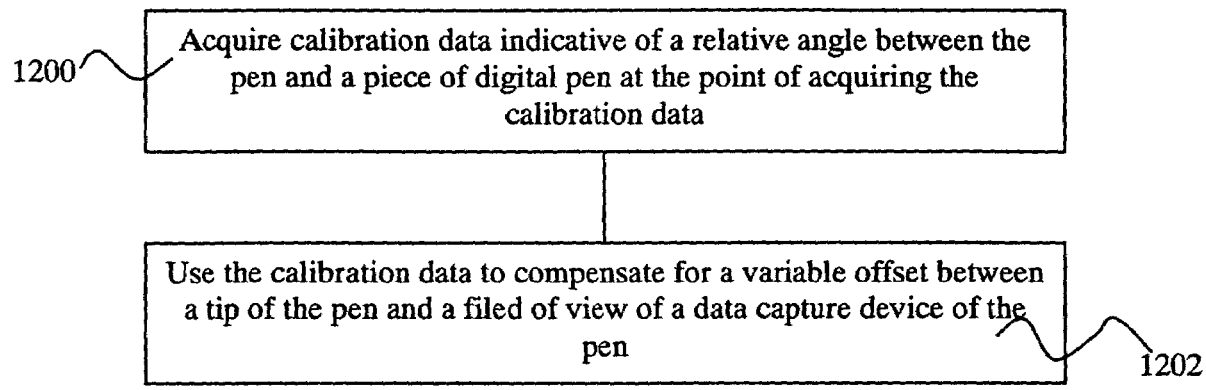
FIG. 11 is a flowchart detailing a method of calibration of the digital pen of FIG. 1, according to another embodiment of the present invention.

Referring now to FIG. 11, a method of calibrating a digital pen comprises acquiring calibration data indicative of a relative angle between the pen and a piece of digital pen at the point of acquiring the calibration data (Step 1200). The calibration data is used to compensate for a variable offset between a tip of the pen and a filed of view of a data capture device of the pen (Step 1202).

What is claimed is:

1. A method of calibrating a digital pen to compensate for a difference in a region of position location pattern printed upon a medium viewed by a camera of the pen and the position of a nib of the pen comprising the steps of:
    i) providing a piece of physical media having a calibration area thereupon, the calibration area providing a plurality of regions each having a calibration pattern, the calibration pattern of a first region rotated with respect to the calibration pattern of at least one second region;
    ii) acquiring calibration data indicative of parameters indicative of an offset between a nib of the pen and a field of view of a camera whilst the pen is in use; and
    iii) using the calibration data to compensate for the offset in usage data subsequently acquired in use of the pen.

2. The method of claim 1 comprising placing the pen adjacent the calibration area in step (i).

3. The method of claim 1 comprising tracing a pre-defined locus within the calibration area.

4. The method of claim 1 comprising determining a rotation parameter indicative of the degree of rotation of the pen relative to the paper.

5. The method of claim 1 comprising determining an inclination parameter indicative of the an angle of inclination between the pen relative to a plane substantially including the piece of media by means of an analysis of an area of position location pattern captured by the pen.

6. The method of claim 1 applying an algorithm to generate a calibration factor relating to at least one of the following: a deviation parameter, a rotation parameter, an inclination parameter.

7. The method of claim 1 comprising executing steps (i) and (ii) at a processor of the pen.

8. The method of claim 1 comprising calibrating at least one of a plurality of pens independently of the remainder of the plurality of pens.

9. The method of claim 1 comprising storing user specific calibration data.

10. The method of claim 9 comprising storing the user specific calibration data at a remote processor.

11. The method of claim 1, wherein the calibration area is subdivided into at least four regions.

12. The method of claim 1, wherein the calibration pattern in each region is rotated in successive equi-angular steps.

13. A digital pen and physical media system, the physical media providing a position location pattern and a calibration area thereupon, the calibration area providing a plurality of regions each having a calibration pattern, the calibration pattern of a first region rotated with respect to the calibration pattern of at least one second region, the pen comprising a nib, a camera and a processor, the nib being arranged to contact the medium having the position location pattern printed thereupon and in at least one instance the calibration area, the camera being arranged to capture an image of an area of position location pattern printed upon the medium in the calibration area, adjacent the point of contact of the nib with the medium and the processor being arranged to process the image to generate calibration data indicative of parameters indicative of an offset between the nib and a field of view of the camera for use in compensating for the offset in subsequently acquired usage data.

14. A pen according to claim 13 comprising memory arranged to store a calibration factor derived from the calibration data.

15. A pen according to claim 14 wherein the processor is arranged to apply the calibration factor to usage data.

16. A pen according to claim 14 wherein the processor is arranged to update the calibration factor in response to a further calibration factor received by the processor.

17. A pen according to claim 16 wherein the further calibration factor is generated at the processor.

18. A pen according to claim 16 wherein the calibration factor is derived at a processor remote from the pen, from the calibration data and is transmitted to the processor of the pen.

19. The pen according to claim 13, wherein the calibration area is subdivided into at least four regions.

20. The pen according to claim 13, wherein the calibration pattern in each region is rotated in successive equi-angular steps.

* * * * *